US009494844B2

(12) United States Patent
Fisher et al.

(10) Patent No.: US 9,494,844 B2
(45) Date of Patent: Nov. 15, 2016

(54) LIGHT SOURCE FOR VIDEO COMMUNICATION DEVICE (71) Applicant: Applied Minds LLC, Glendale, CA (US)

(72) Inventors: Jules Edward Fisher, New York, NY (US); Bran Ferren, Beverly Hills, CA (US); Mason Thomas Barker, Los Angeles, CA (US); Lars Arnt Jangaard, West Hills, CA (US); Michael John Keesling, Agoura Hills, CA (US); Fu C. Lee, Beverly Hills, CA (US); Dimitri Serge Negroponte, Los Angeles, CA (US); Eugene Paul Rizzardi, Jr., Canyon County, CA (US)

(73) Assignee: Applied Minds LLC, Glendale, CA (US)

(*) Notice: Subject to any disclaimer, the term of this patent is extended or adjusted under 35 U.S.C. 154(b) by 126 days.

(21) Appl. No.: 14/224,828

(22) Filed: Mar. 25, 2014

(65) Prior Publication Data

US 2014/0285993 A1 Sep. 25, 2014

Related U.S. Application Data (60) Provisional application No. 61/805,020, filed on Mar. 25, 2013.

(51) Int. Cl.
| | |
|---|---|
| F21V 21/26 | (2006.01) |
| G03B 15/03 | (2006.01) |
| F21V 21/088 | (2006.01) |
| F21V 33/00 | (2006.01) |
| G06F 1/16 | (2006.01) |
| F21Y 101/00 | (2016.01) |

(52) U.S. Cl.
CPC ............. *G03B 15/03* (2013.01); *F21V 21/088* (2013.01); *F21V 21/26* (2013.01); *F21V 33/0052* (2013.01); *G06F 1/1607* (2013.01); *F21Y 2101/00* (2013.01); *F21Y 2113/13* (2016.08); *F21Y 2115/10* (2016.08)

(58) Field of Classification Search
CPC ... G06F 1/1607; G03B 15/03; F21V 21/088; F21V 33/0052; F21V 21/22; F21V 21/26
USPC .......................................................... 362/85
See application file for complete search history.

(56) References Cited

U.S. PATENT DOCUMENTS

| | | | |
|---|---|---|---|
| 5,868,487 | A | 2/1999 | Polley et al. |
| D435,679 | S | 12/2000 | Naghi et al. |
| 6,168,292 | B1 | 1/2001 | Sherman |
| D455,855 | S | 4/2002 | Emerson, Jr. et al. |
| 6,406,161 | B1 | 6/2002 | Lin et al. |

(Continued)

OTHER PUBLICATIONS

"Video Chat Light for Netbooks", © 2012 Kensington Computer Group, a Division of ACCO Brands, Feb. 5, 2013, 1 page (URL unknown).

(Continued)

*Primary Examiner* — Peggy Neils
(74) *Attorney, Agent, or Firm* — Loeb & Loeb LLP (57) ABSTRACT A light source and lighting system for video communication are provided. A base capable of being removably attached to a video communication device is provided. A fill light attached to the base and a key light connected to the base are also provided.

4 Claims, 6 Drawing Sheets

(56) References Cited

U.S. PATENT DOCUMENTS

| | | | |
|---|---|---|---|
| D462,394 S | 9/2002 | Naghi et al. | |
| 6,575,593 B2 | 6/2003 | Krietzman | |
| D484,193 S * | 12/2003 | Huang | D21/333 |
| 6,802,629 B2 | 10/2004 | Krietzman et al. | |
| 6,974,223 B2 | 12/2005 | Krietzman | |
| 7,153,212 B1 | 12/2006 | Karten et al. | |
| D562,485 S | 2/2008 | Brown | |
| D563,582 S * | 3/2008 | Levine | D26/63 |
| 7,490,948 B2 * | 2/2009 | Fisherman | B42D 3/123 362/98 |
| 7,631,979 B1 | 12/2009 | Brown et al. | |
| 7,841,729 B2 | 11/2010 | Geddes | |
| D662,637 S | 6/2012 | Lee | |
| 8,240,862 B1 * | 8/2012 | Newhouse | F21V 33/0052 362/191 |
| 8,500,293 B2 * | 8/2013 | Sutton | G03B 15/02 307/150 |
| 2002/0014960 A1 | 2/2002 | Williams, Jr. | |
| 2003/0227770 A1 | 12/2003 | Chen et al. | |
| 2005/0007778 A1 * | 1/2005 | Lin | F21V 21/32 362/249.07 |
| 2005/0151042 A1 * | 7/2005 | Watson | F16M 11/04 248/226.11 |
| 2007/0103918 A1 | 5/2007 | Lin | |
| 2010/0033960 A1 * | 2/2010 | Levine | F21S 6/003 362/198 |
| 2011/0246146 A1 * | 10/2011 | Kauffman | F21K 9/00 703/2 |

OTHER PUBLICATIONS

"Video Chat Light", Laptop and Monitor Version, Feb. 5, 2013, 2 pages (URL unknown).

"ViewMe, video chatlighting", © 2011 Videssence, Feb. 5, 2013, 1 page (URL unknown).

* cited by examiner

LIGHT SOURCE FOR VIDEO COMMUNICATION DEVICE

This application claims priority from U.S. Provisional Patent Application Ser. No. 61/805,020, filed on Mar. 25, 2013.

FIELD OF THE INVENTION

The present invention relates to light sources, and more particularly, to light sources for video communication devices.

BRIEF SUMMARY OF THE INVENTION

The disclosed subject technology relates to a light source for a video communication device. The device includes a base capable of being removably attached to the video communication device; a fill light attached to the base; and a key light connected to the base.

The disclosed subject technology further relates to a light source for a video-enabled computing device. The light source includes a base capable of being removably attached to the video-enabled communication device and a first lamp fitted in the base. The device further includes an articulating arm connecting a second lamp to the base where the articulating arm is sized and shaped such that the articulating arm folds into a cavity of the base.

The disclosed subject technology further relates to a lighting system for a camera-enabled communication device. The lighting system includes a base and a plurality of first lamps fastened to the base, where the plurality of first lamps include a plurality of solid state light lamps of a plurality of colors. The lighting system further includes a plurality of second lamps in connection with an arm moveably fastened to the base, where the plurality of second lamps include a plurality of solid state light lamps of a plurality of colors.

These and other objects and advantages of the present disclosure will be apparent to those of ordinary skill in the art having the present drawings, specifications, and claims before them. It is intended that all such additional systems, methods, features, and advantages be included within this description, be within the scope of the disclosure, and be protected by the accompanying claims.

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

While the present disclosure may be embodied in many different forms, the drawings and discussions are presented with the understanding that the present disclosure is an exemplification of the principles of one or more inventions and is not intended to limit any one of the inventions to the embodiments illustrated.

DETAILED DESCRIPTION OF THE INVENTION

High quality images are difficult to produce from current video communication devices such as a camera installed in a laptop. Poor ambient lighting in addition to low camera sensitivity leads to poor signal to noise ratio and/or poor frame rates in video communication, and static ambient lighting combined with an in-device camera's auto white-balance circuitry may result in unnatural skin tones and shadows in the image. The light source of the subject technology alleviates these problems and provides a better quality image for visual communication. The light source of the subject technology provides additional illumination so that the camera reduces the amount of artificial gain used by the camera, ultimately reducing the amount of noise in the image. The color temperature of the light source more adequately matches the ambient illumination of the user's environment providing the benefits of providing images with a more uniform skin tone and providing images that minimizing greenish or bluish shadows in the transmitted image. The subject technology's fill light provides benefits of the invention including providing even illumination to the user's face, neutralization of undesirable shadows, and accentuation of facial features. The subject technology's key light adds desirable shadows, further complementing facial features. Some embodiments of the subject technology use further color balancing through automatic or user adjustment of the intensity or color of light.

Figure 1:
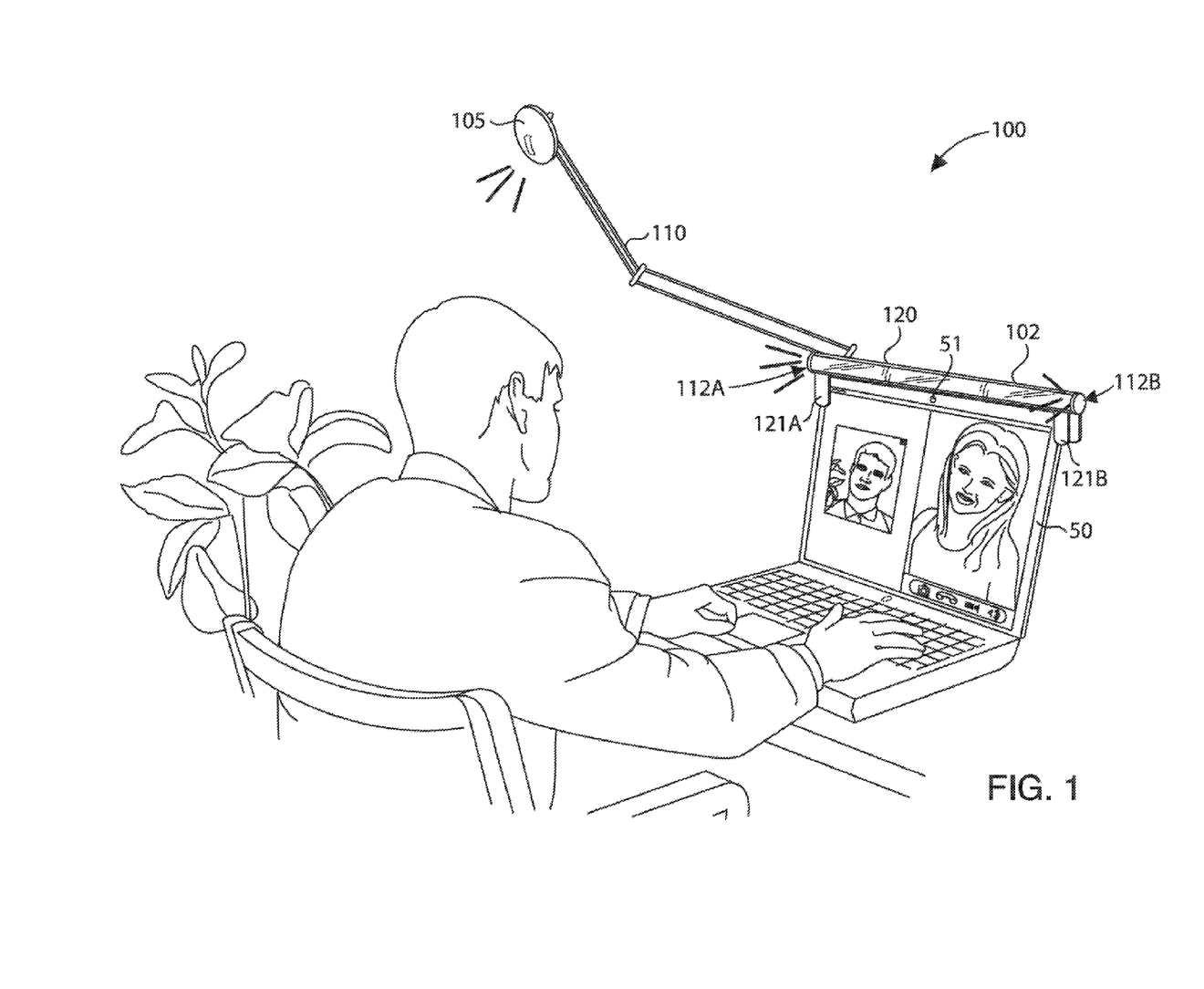
FIG. 1 is a perspective view of an exemplary embodiment of a light source of the subject technology as used by a user with a laptop.

FIG. 1 is a perspective view of an exemplary embodiment of a light source in accordance with an example embodiment of the subject technology as used by a user with a laptop. Light source 100 includes base 102 key light 105, fill light 120, arm 110, and clips 121A and 121B. The base 102 has a first end 112A and second end 112B, opposite the first end 112A. The fill light 105 may be fixedly attached to the base such that the fill light 105 does not move relative to the base 102. The fill light 105 may be disposed linearly along the base 102 such that the fill light 120 extends from the first end 112A of the base 102 to the second end 112B. The key light 105 may be movably connected to the base 102 via arm 110. The arm 110 may be attached adjacent the first end 112A or second end 112B of the base 102. The light source 100 is removably attached to a laptop 50, which has a camera 51 installed with which to conduct video communication. Light source 100, when attached to laptop 50 or other video communication device, is mechanically supported entirely by the video communication device. Accordingly, clips 121A and 121B provide enough pressure to stay affixed to the video communication device and support the key light 105 when fully extended. The term "clips" as used herein encompass the terms' plain and ordinary meanings, including, but not limited to any clips, fasteners, or any device or mechanism capable of temporarily attaching the light source to the video communication device that facilitates the support of the light source by the video communication device. Portions of light source 100 may be constructed of metal, plastic, or a combination of metal and plastic. Clips 121A and 121B may include cushioning material so that the video communication device is not scratched or otherwise damaged when light source 100 is affixed to the device. Other mechanisms may be used to affix the light source in operable association with the laptop 50 or other video communication device as would be understood by those of ordinary skill in the art after having reviewed the present specification and accompanying figures.

The terms "video communication device," "video-enabled computing device," and "camera-enabled communication device" as used herein encompass the terms' plain and ordinary meanings, including, but not limited to: laptops, notebook computing devices, tablet computing devices, smartphones, PC or computer monitors, monitors with integrated or independent cameras, monitors linked to multiple cameras, LCD/flat screen or any other type of video monitor used with any camera or computer/computing device, televisions enabled with integrated or independent video or camera capabilities, or any combination of a device using a visual screen, camera, and/or monitor. The terms are inclusive of any system or part of a system for communication, video recording and/or streaming, surveillance, information sharing, information exchange, personal or business video conferencing, video conversation, social intercourse, interaction, networking or discussion, chat, media, entertainment, or other purposes.

Figures 2A, 2B:
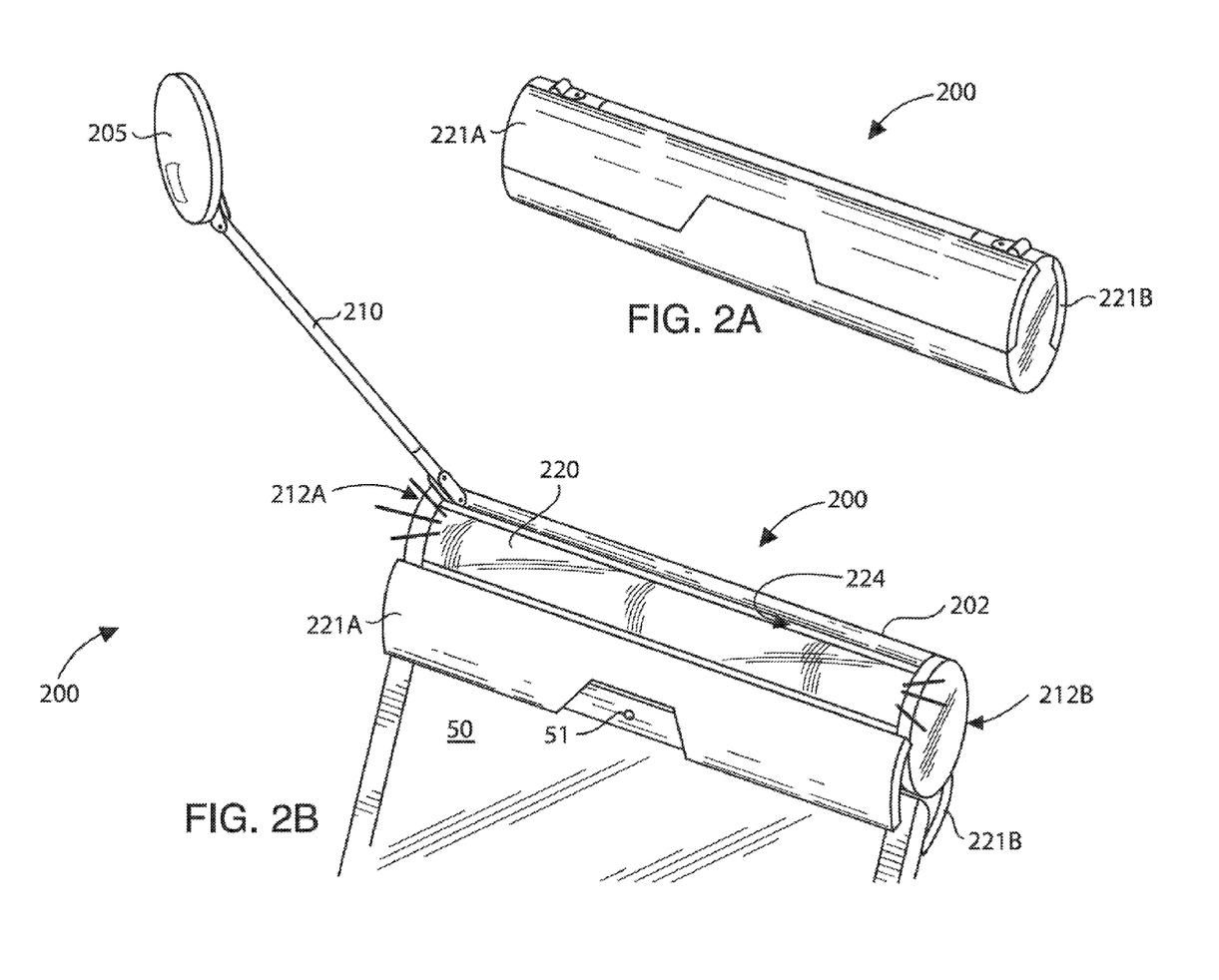
FIG. 2A is a perspective view of the light source in accordance with another example embodiment of the subject technology.
FIG. 2B is another perspective view of the light source of FIG. 2A, removably attached to a laptop.

FIG. 2A is a perspective view of the light source in accordance with another example embodiment of the subject technology. The light source 200 which has a base 202, folds up into a stowed configuration as shown in FIG. 2A furthering a goal of the invention of providing a light source that may easily be stored, transported, protected, and used with a video communication device. Clips 221A and 221B are shaped such that they form part of the case that holds the key light and fill light when the light source 200 is folded into the stowed configuration. Fill light 220 is stored underneath clip 221A in a cavity 224 of the base 202. The cavity 224 may extend from a first end 212A of the base 202 to a second end 212B of the base 202 that is opposite the first end 212A.

FIG. 2B is another perspective view of the light source of FIG. 2A, removably attached to laptop 50. As shown, clips 221A and 221B slide down from the main body of the light source 200 in order to be removably attached to a video communication device. In this position, fill light 220 is no longer covered by clip 221A. Clip 221A is shaped such that when the light source 200 is attached to laptop 50 or other video communication device, the camera 51 is not obscured by any portion of the light source. Telescoping arm 210 folds out of light 200 such that the key light 205 may be articulated in such a manner so as to provide a main light source. Arm 210 may additionally lengthen in a telescoping manner to accommodate a variety of user heights, devices, and potential configurations. Arm 210 may also be detached from the left side of the light source 200 and affixed on the right side of the light source 200 in order to accommodate different lighting conditions and/or user preferences. Providing arm 210 that may be both articulated, moved, and telescoped providing flexibility of use without unnecessarily adding bulk to the light source when stowed away.

Key light 205 and fill light 220 can each use one or more lamp. The lamps may be solid state devices such as LED lights, which provide a benefit of low energy usage, good color rendition, and the ability to manipulate color. Preferred lamps for use with key light 205 of the subject technology are lamps from CREE's XLamp family or Philips Lumiled family. One example of preferred lamp is CREE MLEAWT-A1-R250-0004E5 directly driven at approximately 150 mA with a single lamp for key light 205. Fill light 220 may use multiple strings of multiple LED lamps. One example of a preferred LED for fill light 220 is OSRAM LW Y1SG-BFCF-GKJM-1-Z driven in series at approximately 20 mA. Choice of the number and type of lamps for fill light 220 may be determined based on a total length of the fill light and characteristics of any diffuser or reflector used with fill light 220. Placement of multiple LEDs in fill light 220 may be selected to reduce or eliminate spotting with the fill light 220. Key light 205 and fill light 220 may be composed of all neutral white LEDs or a combination of neutral white LEDs with red, green, and blue LEDs that may be controlled individually and automatically to accommodate a variety of lighting conditions. The placement of lamps in key light 205 may include concentric rings of lamps. The combination, total number, and type of lamp(s) used for key light 205 and/or fill light 220 may be determined such that the entire current draw of light source 200 does not exceed the current limitations of a Universal Serial Bus (USB) port providing power to the light. Other types of lamps are contemplated for use with the subject technology including but not limited to incandescent, halogen, fluorescent, and high-intensity discharge.

Key light 205 and fill light 220 may have one or more optical elements associated with each light. Optical elements may include diffusion or reflection elements. For example, key light 205 may include a diffusion lamp with reduced diffusion in the center of the lamp with the gradient of diffusion increasing towards the outer edges of the key light 205. Incorporating optical elements in key light 205 and fill light 220 further a goal of the invention by better providing improvement and greater control in the quality of light for video communication devices. Key light 205 may provide a "spot light" type of light configured to collimate the light in an overall substantially oval shape. The substantially oval shape of the light emitted from key light 205 may be arranged so that the user's face is illuminated such that little or no light from the key light is incident elsewhere. The substantially oval shape of the emitted light may be achieved by the placement of the lamps within the key light housing, one or more optical elements, or a combination of placement of lamps and one or more optical elements. Fill light 220 may provide a "flood light" type of light providing general illumination from one or more lamps. The combination of the key light and the fill light bear a relationship to each other such that subject, such as the user's face, is better rendered for video communication.

Figure 2C:
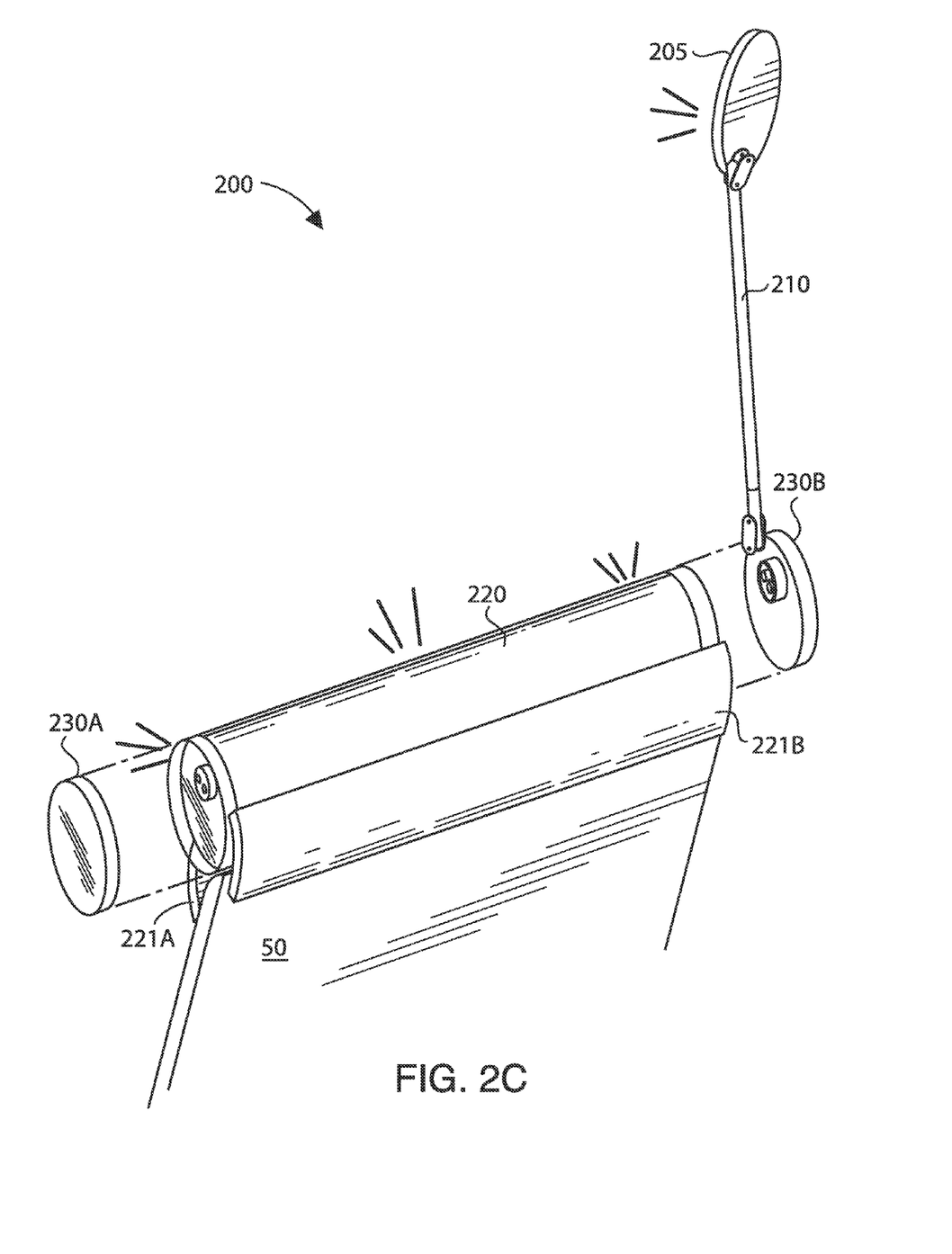
FIG. 2C is a perspective and partially exploded view of the light source of FIG. 2A.

FIG. 2C is a perspective and partially exploded view of the light source 200 of FIG. 2A. Ends of light source 230A and 230B may be configured to make contact with the end of the bulb of fill light 220. Fill light 220 may be a fluorescent lamp or other type of lamp. Ends 230A and 230B can serve as the electrical connection of fill light 220 to a power source.

In addition to powering or recharging a battery for the light source 200, the video communication device may have a user interface and software so that a user may control the light source 200. The user interface may allow the user to operate all or a portion of the light in a manner including but not limited to: on/off operation, dimming, adjusting for color temperature, and/or adjusting the focus, contrast, resolution, tone, or sharpness of the lights. Control of the light may further include physical manipulation of the device including, but not limited to movement of the clips, movement of the light disposed in the base, movement or focusing of any light, and movement of the articulating and/or telescoping features of the arm. The user interface may allow complete (and potentially independent) control of any one or more of the above elements by the user or may present a selection of preset "effects" for the user to choose from. The software associated with the light source 200 and the video communication device may provide for lighting condition detection using the camera and may either automatically compensate for the present lighting conditions or the user interface may be configured to provide the user with a choice of automatic adjustment or custom control. Different lighting "effects" may be selected or customized and saved for future use. Among these "effects" may include effects specialized for skin tone, ethnicity, social usage, gender, orientation, age, special effects, or other specialized use. Selected or customized "effects" may be associated with different teleconference contacts. Even further, the software and camera may further "detect" an emotional state of the user, and soften or accentuate the emotional state of the user through color temperature and softness of the light. In another embodiment, hardware controls for operation, dimming, effects, and color temperature may be located on the body of the light source.

Figure 3A:
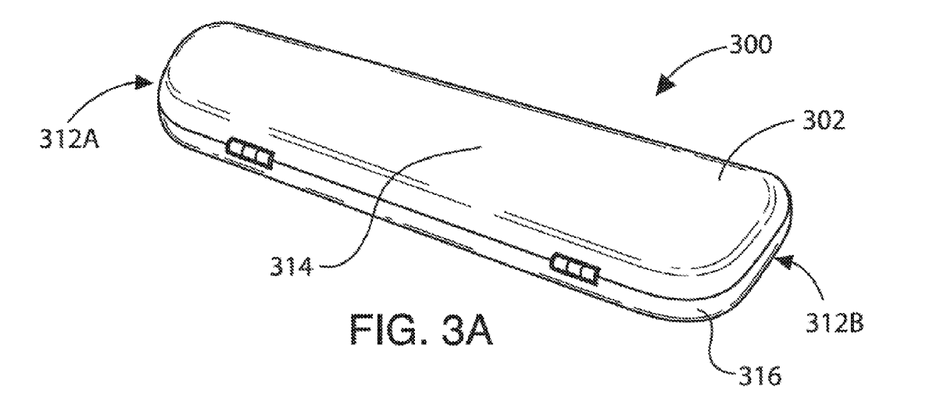
FIG. 3A is a perspective view of a light source of the subject technology in accordance with another example embodiment.

FIG. 3A is a perspective view of a light source 300 of the subject technology in accordance with another example embodiment. The light source 300 includes a base 302 having a first end 312A and a second end 312B opposite the first end 312A. The base 302 may include a first portion 314 hinged to a second portion 316 forming a cavity 324 that extends between the first and second portions 314, 316 from the first end 312A to the second end 312B of the base 302. The light source 300 and an articulating arm 310 may fold up into a hinged case stowed configuration as shown in FIG. 3A furthering a goal of the invention of providing a light source that may easily be stored, transported, protected, and used with a video communication device.

Figure 3B:
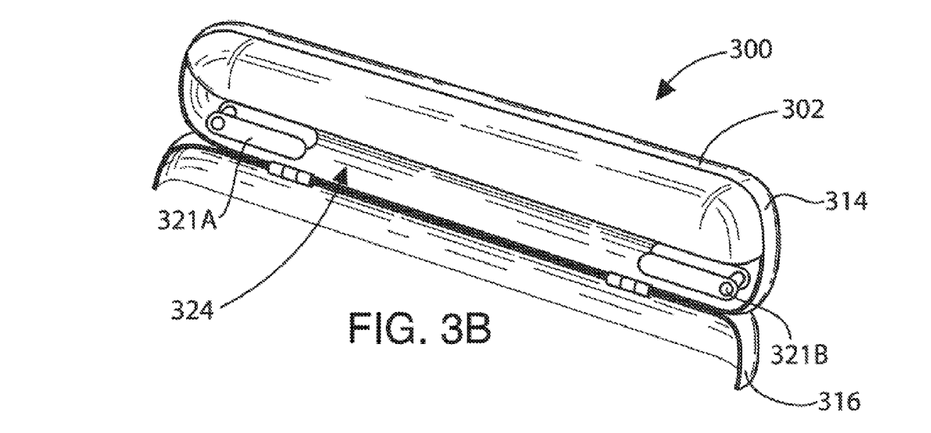
FIG. 3B is another perspective view of the light source of FIG. 3A.
Figure 3C:
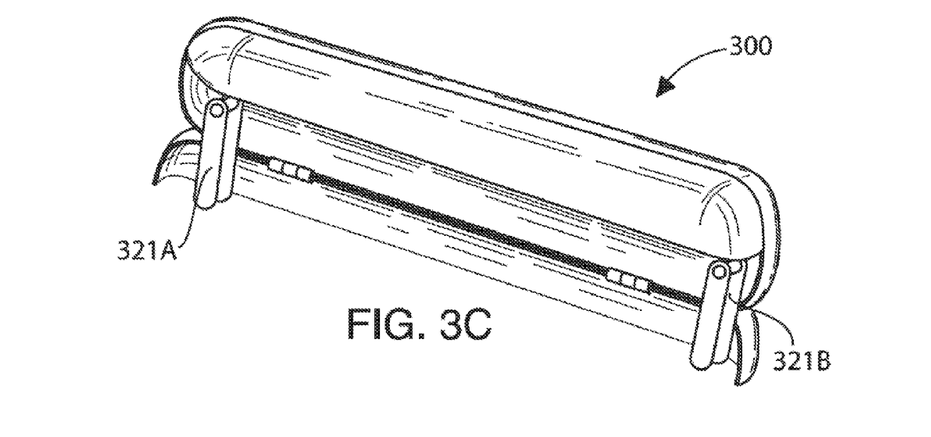
FIG. 3C is another perspective view of the light source of FIG. 3A.
Figure 3D:
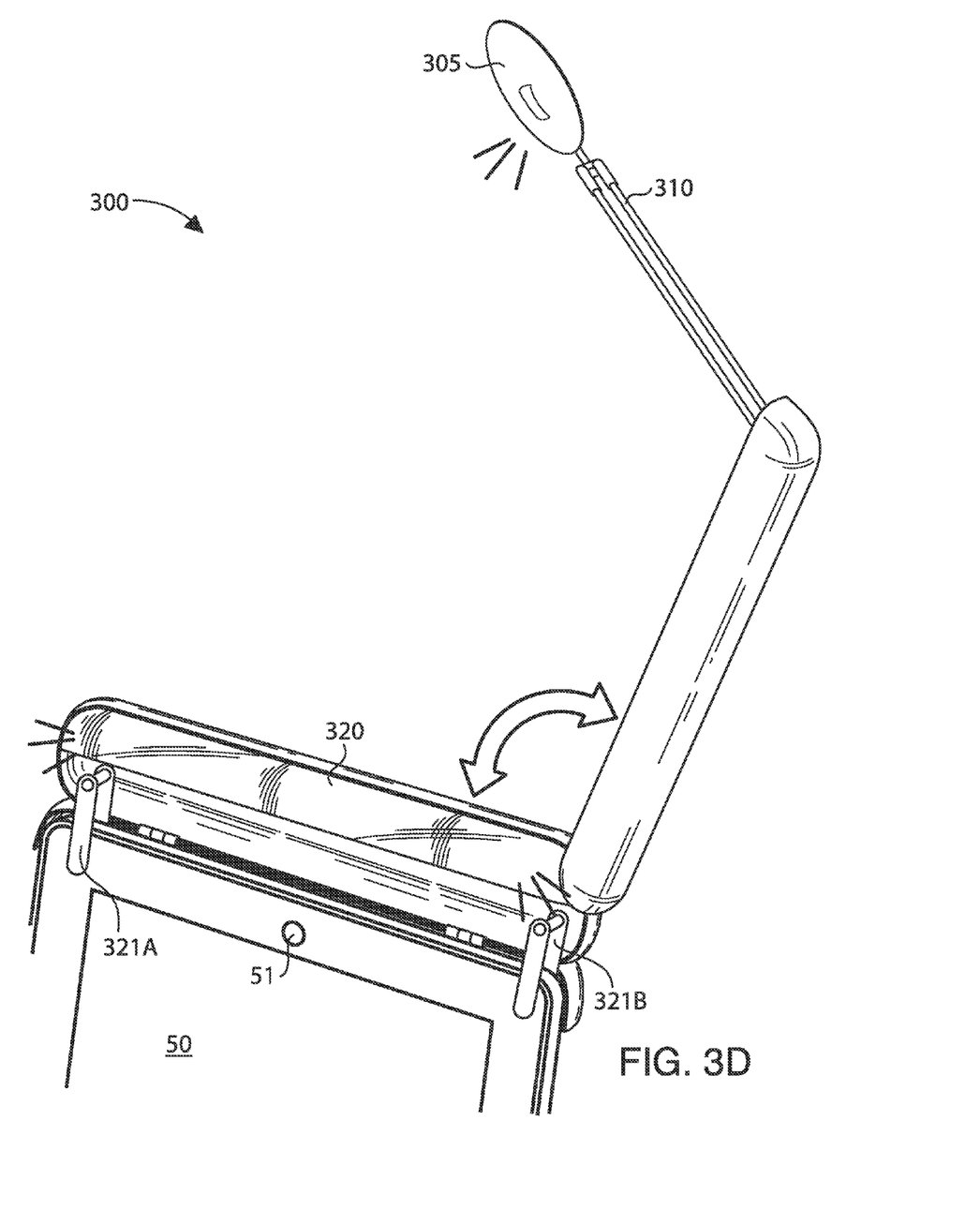
FIG. 3D is another perspective view of the light source of FIG. 3A.

FIGS. 3B-3C present additional perspective views of the light source of FIG. 3A. Clips 321A and 321B may be fixed to light source 300 by fasteners on one end of each clip so that they may be folded into the case for storage and may fold out (as shown in FIG. 3C) such that they attach light source 300 to a video communication device (as shown in FIG. 3D). A cable for connecting the light source to the video communication device or a power cord may be stored in the space between clips 321A and clips 321B of FIG. 3B when the light source 300 is not in use. FIGS. 3B-3E depict clips 321A and 321B as positioned at either end of light source 300, but these clips may be adjustable, moveable, or fixed along or at any width to accommodate video communication devices of a variety of sizes. For example, the clips may be adjustable such that the same light source 300 may be clipped to laptop or a smart phone via adjustable clips 321A and 321B.

FIG. 3D is another perspective view of the light source 300 of FIG. 3A. A portion of the case may be fixed to other portions of the case at one end, such that a portion of the exterior case forms a portion of articulable arm 310. Key light 305 may be affixed to another portion of arm 310 providing additional flexibility in positioning key light 305. Key light 305 may be connected to arm 310 in such a manner that the key light 305 may be rotated or moved in multiple directions.

Figure 3E:
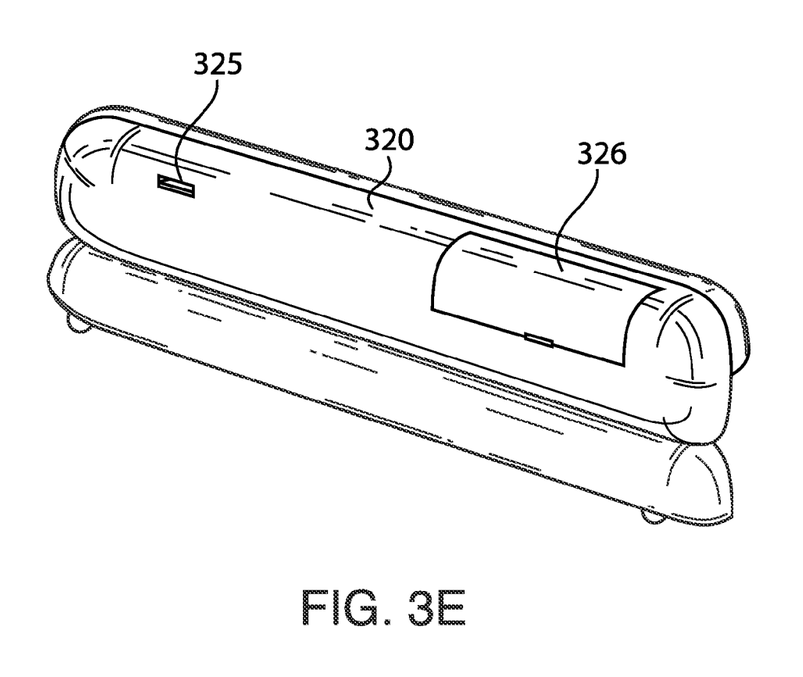
FIG. 3E is another perspective view of the back of the light source of FIG. 3A.

FIG. 3E is another perspective view of the back of the light source of FIG. 3A. Light source 300 may include a USB port 325. In addition to or instead of a USB port, the light source may be configured to include a port supporting electrical connection to the video communication device via any other known bus connection. The light source 300 may be powered via rechargeable or disposable battery stored in battery compartment 326. The battery in compartment 326 may be recharged via the video communication device through USB port 325. A USB cable may be removably, retractably, or integrally formed as part of the body of light source 300. An additional compartment may be formed in the body of light source 300 in which to store a USB cable when not in use.

The foregoing description and drawings merely explain and illustrate the invention and the invention is not limited thereto. While the specification in this invention is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. It is understood that features and components of embodiments as depicted herein may be combined and or substituted to form additional implementations and embodiments. To those skilled in the art, the invention is susceptible to additional implementations or embodiments and certain of these details described in this application may be varied considerably without departing from the basic principles of the invention. It will thus be appreciated that those skilled in the art will be able to devise various arrangements, which, although not explicitly described or shown herein, embody the principles of the invention and, thus, are within its scope and spirit. All publication patents and patent applications described herein are incorporated by reference in their entirety.

What is claimed is:

1. A light source for a video-enabled computing device, the light source comprising:
   a base capable of being removably attached to the video-enabled communication device;
   a fill lamp, which provides even illumination of a user's face, fitted in the base; and
   an articulating arm connecting a spot light, which provides collimated light to create desired shadows, to the base, wherein the articulating arm is sized and shaped such that the articulating arm folds into a cavity of the base.

2. The light source of claim 1, wherein the base comprises a first portion hinged to a second portion forming a cavity therebetween when the base is in a closed position, wherein the fill lamp, the spot light, and the articulating arm may be stowed within the cavity of the base in the closed position.

3. The light source of claim 2, further comprising one or more clips removably attaching the base to the video-enabled communication device, wherein the one or more clips is stowed within the base in the closed position.

4. The light source of claim 1, wherein the articulating arm includes a telescoping portion.

* * * * *